United States Patent Office 3,551,482
Patented Dec. 29, 1970

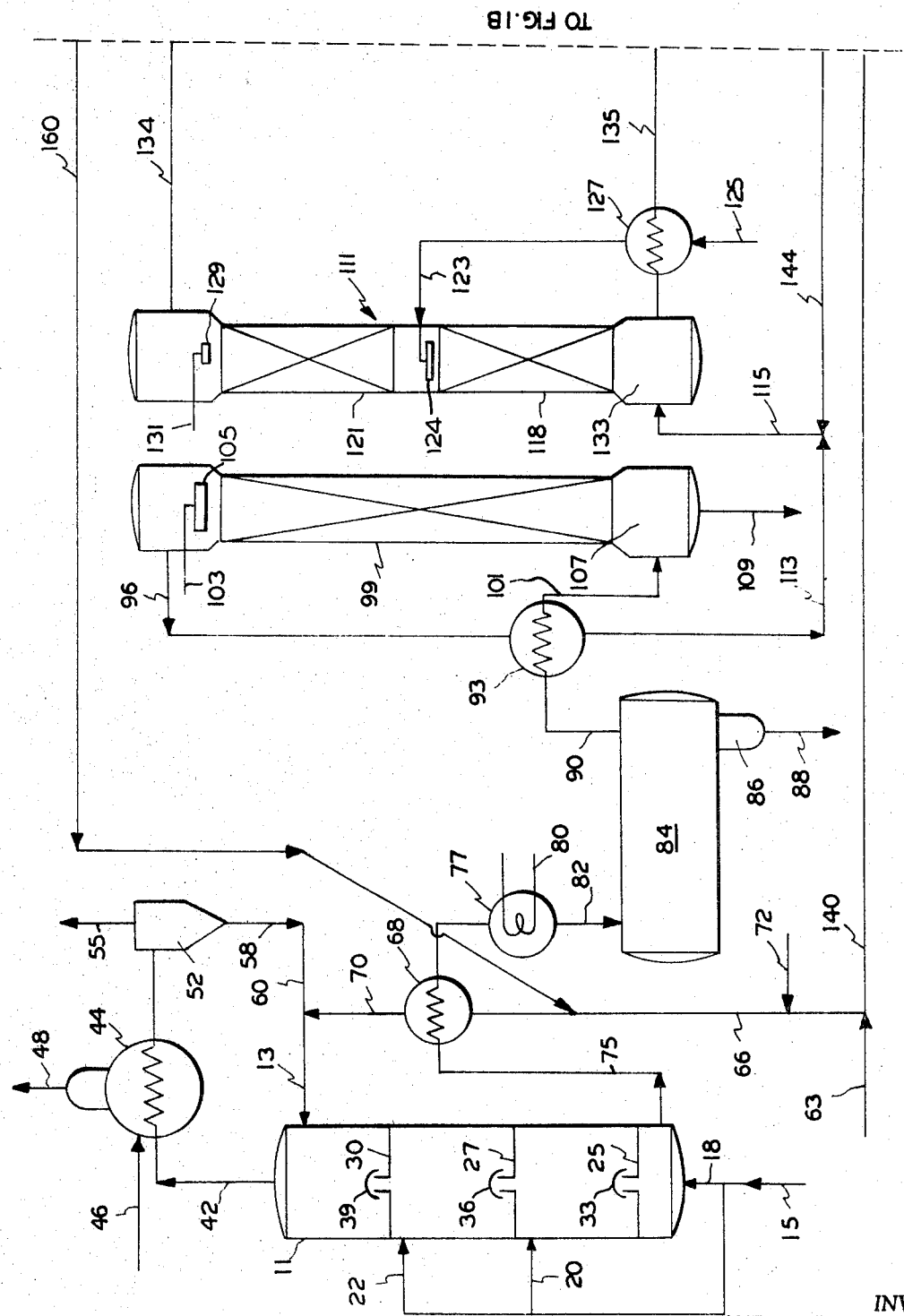

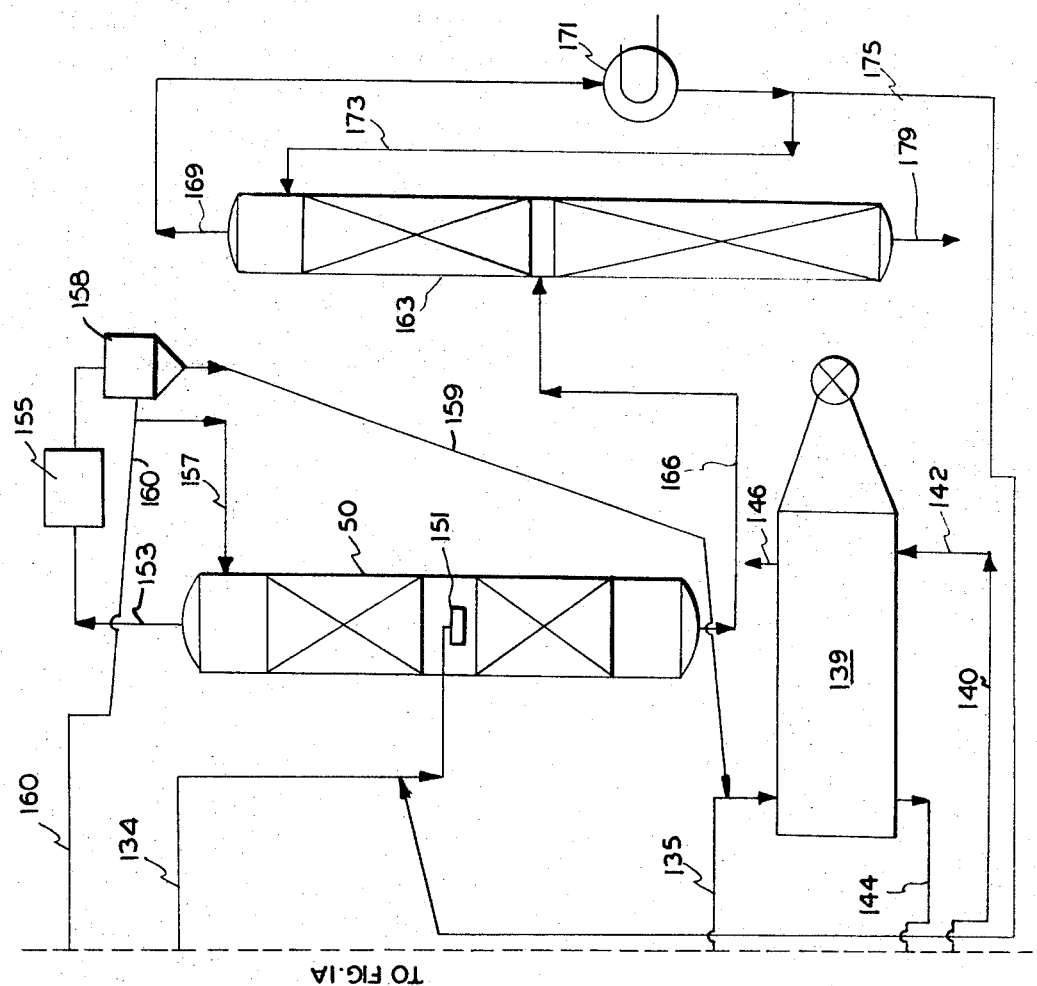

3,551,482
CYCLOHEXANE OXIDATION PRODUCTS RECOVERY
Werner Gey, Offenbach, Hansdieter Hofmann, Petterweil, Friedrich Bende, Bergen-Enkheim, and Peter Bönders, Offenbach, Germany, assignors to Vickers-Zimmer Aktiengesellschaft Planung und Bau von Industrieanlagen, Frankfurt am Main, Germany, a corporation of Germany
Filed June 14, 1966, Ser. No. 557,463
Int. Cl. C07c 51/20
U.S. Cl. 260—533                                        4 Claims

ABSTRACT OF THE DISCLOSURE

In a method where cyclohexane is converted by contact with a molecular oxygen-containing gas to a reaction product containing cyclohexanol, cyclohexanone and by-products including adipic acid and water, the improved separation procedure which comprises allowing the reaction product to settle without further addition of water to produce an aqueous phase containing adipic acid and an organic phase, washing the organic phase with dilute aqueous nitric acid to produce a wash effluent containing nitric acid and adipic acid and a nitric acid treated organic phase, contacting the nitric acid treated organic phase with dilute aqueous caustic solution to decompose cyclohexanol esters to cyclohexanol, contacting the caustic treated organic phase with water to remove water-soluble components and produce a combined caustic and water treatment effluent and a washed organic phase, and treating the washed organic phase by distillation to remove therefrom unreacted cyclohexane and a mixture of cyclohexanol and cyclohexanone substantially free of impurities.

---

The present invention relates, in general, to treatment of the product of liquid phase partial oxidation of cyclohexane and, in particular, to an improved process for removing unwanted by-products from the partial oxidation product. It is now well established in the art that processes for the oxidation of cyclohexane constitute an important phase in the manufacture of nylon intermediates such as adipic acid which is subsequently copolymerized with hexamethylene diamine to produce a polyamide capable of being spun into a fiber having certain desirable characteristics. To a great extent, it has been shown and it is now realized that the purity of the nylon intermediates exerts a considerable effect upon the qualities of said fiber.

Considerable attention has been devoted to the development of oxidation procedures which provide a high yield of the desired adipic acid in a substantially pure state, and two-step processes have been increasingly favored. In one such process cyclohexane is oxidized with air under conditions suitable to yield a mixture of cyclohexanol and cyclohexanone at a low conversion per pass, followed by separation of these intermediates from cyclohexane which is recycled to the oxygen-gas contact. The cyclohexanol-cyclohexanone mixture, called anolone, is passed to the second oxidation step where it is contacted with nitric acid for conversion to adipic acid.

While various attempts have been made to air-oxidize cyclohexane to produce maximum amounts of cyclohexanol and cyclohexanone, the by-product problem often is not satisfactorily solved. Many processes convert, wastefully, large amounts of cyclohexane to by-products which are unusable in adipic acid production. For example, the oxidation system may produce substantial quantities of monobasic acids such as formic, acetic, and valeric acids; dibasic acids such adipic, succinic, and glutaric; esters, aldehydes and cyclohexyl-hydroperoxide, as well as tars, high boiling polymers and water formed during the reaction. Of these, the adipic acid, if it can be recovered, can add to the ultimate yield of the procedure. Further, cyclohexyl-hydroperoxide and esters of cyclohexanol, if recoverable, can be converted to materials usable in the total process and thus add to the yield. The other by-products, however, are substantially unusable and must be separated out from the desired product and discarded.

Even when by-product production is at a minimum, known separation procedures often do not successfully remove them from the product stream and often do not successfully recover any adipic acid or other usable by-products.

In accordance with this invention, it has been found that a significant amount of the adipic acid in the oxidation reaction product may be recovered by allowing the reaction product to settle into an aqueous phase and an organic phase. This aqueous phase carries with it up to about 95% or more of the adipic acid in the oxidation product stream, usually at least about 60–75% of the adipic acid. From the aqueous phase the adipic acid may be directly recovered or this aqueous phase may be added to the adipic acid product obtained later in the process stream by oxidation of anolone. The settling usually takes place under temperature conditions lower than the oxidation procedure, say a temperature of about 50–120° C. and a pressure at least sufficient to maintain the components of the oxidation product stream in the liquid phase.

This invention also is based, in part, on the discovery that a series of aqueous wash procedures may be applied to the cyclohexane oxidation product to clean out the by-products from the desired anolone and to separate the anolone from unreacted cyclohexane. In this invention, the reaction product is first allowed to separate into aqueous and organic phases and the organic phase is treated in succession with dilute nitric acid, dilute caustic and water before being separated into cyclohexane and anolone. Although the caustic washing of such reaction products is known, the combination of steps of this invention provides for improved purification of the anolone product and for improved recovery of usable by-products. In particular, water-washing of the caustic-treated product removes caustic stemming from the caustic treatments prior to the water wash.

The process of this invention is particularly useful with the oxidation procedure described in copending application Ser. No. 557,406, filed June 14, 1966. In this procedure, cyclohexane is converted by feeding it to a reaction zone wherein it is contacted with molecular oxygen-containing gas at a plurality of separate points in its flow through the reaction zone to provide for a controlled oxygen content which varies in the reaction mixture in various parts of the reaction zone. Conversion of cyclohexane is restricted to about 4.0 to 15.0 percent, and optimum results are obtained when about 0.05 to 0.2 mole of oxygen is introduced per mole of cyclohexane. The residence time of the liquid reaction mixture in the reaction zone is about 5–30 minutes and the reaction preferably takes place in the liquid phase under boiling conditions of temperature and pressure. Usually a temperature of about 150–180° C. is employed. The reaction often uses a catalyst, e.g., a cobalt compound.

After removal from the oxidation reaction, the product is passed to a settling zone for removal of most of the water of reaction. The mixture of partially oxidized material and unreacted cyclohexane is cooled to about 100° C. to insure that water present in the mixture will be in the liquid phase and no further water is added to the product at this time. As it settles out, the water passes through the organic phase, acting as a washing medium to remove acid and other water-soluble components from the product stream by dissolution. Among these components is adipic acid in a quantity sufficient to warrant recovery. This aqueous phase is sent to an adipic acid recovery system which may well be the recovery system which treats the product of the subsequent anolone-nitric acid reaction.

The organic phase is sent to a nitric acid washing. This step is more thoroughly described in copending application Ser. No. 557,416, filed June 14, 1966. The resulting mixture of water, nitric acid, adipic acid and some other acids is a valuable source of adipic acid and can be exploited for both its adipic acid content and its nitric acid content by using it as a diluent for concentrated nitric acid passing to the second step of the nitric acid oxidation system.

The nitric acid-washed organic phase is then sent to caustic washing which, as previously mentioned, the art has considered adequate for removal of further acids from the stream of cyclohexane and partially oxidized products. In this invention, the organic phase is contacted with caustic solution and then with another aqueous wash for removal of caustic and other water-soluble materials, such as soaps, etc., present in the caustic-treated liquid product. The organic phase enters the caustic treatment zone at a temperature of, say, about 90° C. and countercurrent contact may desirably be used. The concentration of the caustic, which usually is sodium hydroxide, although, suitable potassium compounds may also be employed when feasible, is about 2–0%, say about 4%, and is used in the amount of about one part caustic solution for each 5–20, preferably 10–15, parts by volume of the organic phase. The temperature of the contact will be about 75–100° C. at a pressure sufficient to maintain a liquid phase system.

After caustic contact, the organic phase is washed with water also at a temperature of about 75–100° C. The water may be used in a volume of about 7–22, preferably about 10–17, volumes of water per volume of organic liquid. This double wash serves to remove caustic and sodium salts from the organic phase.

Both of these contact steps are conveniently conducted in elongated vertically disposed towers packed with inert contact solids such as Raschig rings. The aqueous phases removed from these treatments also carry with them some anolone and advantageously these wash effluents are combined and treated for anolone recovery. It has been found preferable to conduct both caustic and water wash steps in a single tower, feeding the organic material to a lower portion of the tower and removing the treated organic material from near the top of the tower. Water is fed to the top of the tower and caustic to a mid-section of the tower. The combined wash effluents thus may be drawn from the bottom of the tower and the wash water may serve for further dilution of the caustic in the caustic wash treatment.

The recovery of anolone from the combined wash effluent is conveniently accomplished by extracting the aqueous mixture with a small amount, say about half (25–75%) its volume, of cyclohexane, which has a preferential affinity for the anolone components. This extraction may be accomplished in an elongated horizontally disposed contact vessel as well as in an extraction column. The aqueous wash effluent may be fed to one end of this vessel at one end and cyclohexane fed at the opposite corner of the vessel. Aqueous raffinate may be removed from the vessel at a position remote from the aqueous material introduction and be sent to waste while a mixture of cyclohexane and anolone recovered from the other end is sent to any convenient recovery means, for example, back to the caustic washing step. The recovery of anolone can also take place in well known manner by azeotropic distillation.

The water-washed organic phase comprises unreacted cyclohexane, anolone components and other generally neutral oxidation reaction by-products. These are treated, for example, by distillation, first for removal of cyclohexane which is recycled to prior steps in the process, e.g., the reactor, or to the caustic wash effluent treatment, etc. The remaining organic materials are then further treated for isolation of cyclohexanol and cyclohexanone from unwanted by-products which are sent to ultimate disposal.

The invention will be better understood by reference to the accompanying drawing, the sole figure of which is a flow sheet of an anolone manufacture and recovery procedure. In the drawing, 11 is a reactor wherein cyclohexane entering by way of line 13 is subjected to counter-current contact with air which is supplied by line 15 through lines 18, 20 and 22. Plates 25, 27 and 30 in the reactor are supplied with the tube and bubblecap arrangements 33, 36 and 39 to define three oxidation stages in the reactor. Unreacted gases, containing cyclohexane vapors, leave reactor 11 by way of line 42. In condenser 44, cyclohexane is converted back to liquid form while water from line 46 is converted to steam which leaves by line 48. This steam may be used to supply heat for later stages in the process, for example, for the distillation column 50 (FIG. 1B). Condensed cyclohexane collects in tank 52 from which the off gases can be drawn by line 55 while cyclohexane is refluxed to the reactor 11 by means of lines 58, 60 and 13. Fresh cyclohexane feed may be brought to reactor 11 from line 63 by way of line 66, heat exchanger 68 and line 70. If desired, catalyst may be supplied to the reaction in a solution from line 72.

Reaction product leaving the bottom of reactor 11 by line 75 may be passed through heat exchanger 68 to warm the feed cyclohexane and the reaction product may be further cooled in exchanger 77 by indirect contact with water in coil 80. Cooled reaction product mixture is carried by the line 82 to quiescent settler 84. An aqueous phase settles out of the reaction product and collects in the sump 86. This aqueous phase, in passing through the reaction product, carries with it adipic acid product from the reactor 11. These materials are drawn off by line 88 to an adipic acid recovery procedure. The organic phase, which comprises mostly cyclohexane, carries with it the anolone and a number of by-products including acids, esters, etc. This phase passes by line 90 to the heat exchanger 93 where it is cooled by contact with the acid-washed organic phase leaving, by way of line 96, the acid wash column 99. The unwashed organic phase is introduced to the wash column 99 by the line 101 which, as shown, is located in a lower portion of the column. Aqueous nitric acid solution is introduced to the column 99 by line 103 and distributor 105. This aqueous nitric acid solution passes downwardly in the column 99 counter-current to the upwardly flowing organic phase from line 101 and in this passage washes out further adipic acid from the organic phase. This aqueous solution gathers in the bottom 107 of the column 99 whence it may be removed by line 109 and sent to, for example, the adipic acid production stage where it may be used as a diluent for the concentrated nitric acid being sent to the second oxidation stage.

From the heat exchanger 93 the acid-washed organic phase is carried to a further wash column, indicated generally as 111, by the lines 113 and 115. The column 111 is, in effect, two wash columns placed one above the other, the lower portion 118 comprising a caustic wash zone and the upper portion 121 comprising a water wash zone. In the lower zone 118, the acid-washed organic phase passes upwardly in counter-current contact with downwardly flowing sodium hydroxide solution. The caustic is introduced as an about 6% solution at about the midpoint of column 111 by distributor 124, which receives the caustic solution from source 125 by way of heat exchanger 127 and line 123.

After its contact with the caustic solution, the organic phase passes through the water wash section 121 in counter-current contact with water introduced by distributor 129 and line 131. After the water wash, the organic phase, freed of water-soluble constituents, both those remaining after the acid and caustic washes and those created by the acid and caustic washes, passes by line 134 to distillation column 50. The water wash, passing downwardly through section 121, as mentioned, dissolves out water-soluble materials from the organic phase and also carries with it some anolone components. When it enters section 118 this water serves to dilute the caustic solution being introduced by line 123, providing more solvent medium for the dissolution of slightly water-soluble components of the organic phase. The diluted caustic, containing solubles, gathers at the bottom 133 of column 111 and is drawn off by line 135 to liquid extractor 139. As shown, line 135 may pass through heat exchanger 127 where residual heat in the wash solution may be used to heat caustic solution from source 125.

As previously mentioned, the aqueous and caustic wash effluent carries some anolone components with them. These components are recovered in the extractor 139 by passing cyclohexane to the extractor by lines 140 and 142. The cyclohexane dissolves out the anolone components from the wash effluent and carries them by lines 144 and 115 back to the wash sections 118 and 121. The aqueous raffinate from the extractor 139 passes out of the system by line 146, usually to waste.

Cyclohexane-anolone mixture, as mentioned, passes by line 134 to the distillation column 50, usually at its midsection and may be distributed therein by the distributor 151. In this distillation column conditions are arranged for upward migration of cyclohexane and downward migration of materials higher boiling than cyclohexane, including the cyclohexanol and cyclohexanone components of anolone. Cyclohexane travels to the upper end of the column whence it may be removed by line 153, condensed in condenser 155 and sent back to the top of column 50 as a reflux by line 157, after the water dissolved in the reaction product is removed by means of the separator 158. The separated water is fed to the liquid extractor 139 by lines 159 and 135. In addition, cyclohexane is removed from the system for disposal by line 160, and is conducted by lines 160, 66, heat exchanger 68 and lines 70 and 13 back to the reactor 11.

Removal of cyclohexane from the anolone is completed in second distillation column 163 which receives the bottoms from column 50 by way of line 166 at about its midsection. Once more, conditions in this column are arranged for upward migration of cyclohexane and downward migration of higher boiling components. Cyclohexane vapors may be removed from the top of column 163 by line 169 and condensed in condenser 171. Some of the stream of liquified cyclohexane may be conducted by line 173 back to the top of column 163 for reflux, while another portion is conveyed by line 175, line 134 and distributor 151 to the column 50.

Anolone and higher boiling materials are conveyed by line 179 from the bottom of column 163 to further purification and to conversion of analone to adipic acid by, for example, nitric acid oxidation.

The following examples of this invention are to be considered illustrative only and not limiting.

EXAMPLES I–III

These examples show the benefits to be derived by quiescent settling of the oxidation reaction product to obtain an aqueous phase carrying with it the bulk of the adipic acid.

A series of oxidation runs were performed upon cyclohexane to conversion levels of about 5.0, 8.0 and 12.0%, reported as Examples I, II and III, respectively. Analysis of the primary oxidation product shows the following composition in kilograms per hour, with cyclohexyl hydroperoxide reported as cyclohexanol and the esters reported as their components:

| Example | I | II | III |
|---|---|---|---|
| Cyclohexane | 931.5 | 901.0 | 848.5 |
| Cyclohexanol | 22.8 | 41.0 | 45.4 |
| Cyclohexanone | 17.2 | 26.0 | 36.7 |
| Adipic acid | 3.2 | 6.5 | 8.7 |
| Other dicarboxylic acids | 0.3 | 0.5 | 0.7 |
| Monocarboxylic acids | 12.1 | 19.0 | 23.7 |
| Water | 9.0 | 17.0 | 24.3 |
| High boilers | 3.9 | 10.0 | 12.6 |

In each example, the oxidation product was introduced, at the rate of 1,000 kg./hr., and after cooling and reducing the pressure, into a quiescent separation zone. The separation conditions in each run were as follows:

| Example | I | II | III |
|---|---|---|---|
| Temperature (° C.) | 80 | 100 | 120 |
| Pressure (atm.) | 1.0 | 3.0 | 4.0 |
| Residence time | 5.0 | 5.0 | 8.0 |

The resulting organic phase was continuously withdrawn from the settling zone and had the following composition in kilograms per hour:

| Example | I | II | III |
|---|---|---|---|
| Cyclohexane | 931.5 | 901.0 | 848.5 |
| Cyclohexanol | 22.6 | 39.8 | 42.0 |
| Cyclohexanone | 17.1 | 25.9 | 36.4 |
| Adipic acid | 0.2 | 1.2 | 1.5 |
| Other dicarboxylic acids | 0.0 | 0.0 | 0.0 |
| Monocarboxylic acids | 10.3 | 15.0 | 17.3 |
| Water | 5.0 | 10.0 | 13.5 |
| High boilers | 3.1 | 5.5 | 6.1 |

The aqueous phase in each case had the following composition:

| Example | I | II | III |
|---|---|---|---|
| Cyclohexane | 0.0 | 0.0 | 0.0 |
| Cyclohexanol | 0.2 | 0.2 | 0.4 |
| Cyclohexanone | 0.1 | 0.1 | 0.3 |
| Adipic acid | 3.0 | 5.3 | 7.2 |
| Other dicarboxylic acids | 0.3 | 0.5 | 0.7 |
| Monocarboxylic acids | 1.8 | 4.0 | 6.4 |
| High boilers | 0.8 | 4.5 | 6.5 |
| Water | 4.0 | 7.0 | 10.8 |

These examples show the beneficial effect of quiescent settling, according to this invention, on the removal of adipic acid from the primary oxidation stream.

EXAMPLE IV

A three-stage cyclohexane-air-oxidation system converts about 11.0% of the cyclohexane to anolone and by-products. The product mixture is cooled from 180° C. to about 100° C. in a series of coolers. A sample of the reaction product mixture at this point shows it to contain, by weight, 89.0% unreacted cyclohexane, 6.3% anolone, 2.3% recoverable by-products (adipic acid, cyclohexyl peroxide and cyclohexanol esters), 0.7% unrecoverable by-products and 1.7% water of reaction.

The cooled reaction mixture is conducted to a quiescent settling zone where almost the entire water content settles to the bottom of the zone carrying with it about 58% of the adipic acid in the product stream along with other water-soluble acids. This aqueous phase is removed from the settler and sent to adipic acid recovery. The organic phase leaving the settler is cooled to about 40° C. and passed to the bottom portion of a wash column. The upflowing, organic phase passes counter-current to dilute (16%) nitric acid and the resulting wash effluent is drawn off from the bottom of the wash column. It contains 41.8% of the adipic acid from the original reaction product mixture for a total adipic acid recovery of about 99%.

The organic phase, removed from the top of the wash column and found to be composed of 91.1% cyclohexane, 6.4% anolone, 0.1% recoverable by-products and 2.4% unrecoverable by-products, is heated to about 90° C. and conducted to the bottom of a second wash tower where it passes upwardly counter-current to, first, a caustic solution and then to water. The combined wash effluents are removed from the bottom of the tower, containing 62.4% of unrecoverable by-products and 4.6% anolone, based on the original reactor effluent. This aqueous phase is further contacted with cyclohexane in an extraction step to recover 97% of the contained anolone.

The organic phase leaving this wash tower contains 93.4% cyclohexane, 5.9% anolone and 0.7% unrecoverable by-products, the cyclohexanol esters mainly having been converted to cyclohexanol and acids. In the series of distillations which follow, the anolone is recovered in a purity of about 99 weight percent while the unrecoverable by-products containing 10 weight percent anolone are discarded.

It is thus seen that the multiple wash procedure of this invention enables cyclohexanol-cyclohexanone mixture to be recovered from cyclohexane-air oxidation in a purity of about 99% and a yield of about 68% of theoretical, based on cyclohexane conversion of about 8.0% while 99% of the adipic acid by-product in the reactor effluent is recovered as usable by-product.

What is claimed is:

1. In a method wherein cyclohexane is converted by contact with a molecular oxygen-containing gas to produce a reaction product containing cyclohexanol, cyclohexanone and by-products including adipic acid and water, the improvement for the separation and recovery of desired products which consists essentially of withdrawing the total reaction product directly from the conversion zone to a quiet settling zone, maintaining said reaction product in said settling zone at a temperature of about 50–120° C. and a pressure sufficient to maintain the liquid phase, until said reaction product separates into an upper organic phase and a lower aqueous phase containing at least about 60% of the adipic acid in the reaction product, removing said aqueous phase from said settling zone for recovery of adipic acid therefrom, washing said organic phase with dilute aqueous nitric acid to produce (a) a wash effluent containing nitric acid and adipic acid, and (b) a nitric acid-treated organic phase; contacting said nitric acid-treated organic phase with dilute aqueous caustic solution to decompose cyclohexanol esters to cyclohexanol, contacting the caustic-treated organic phase with water to remove water soluble components and produce a combined caustic and water treatment effluent and washed organic phase, and treating said washed organic phase by distillation to remove therefrom unreacted cyclohexane, and a mixture of cyclohexanol and cyclohexanone substantially free from impurities.

2. A method according to claim 1 wherein the combined caustic and water treatment effluent is extracted with cyclohexane to recover cyclohexanol and cyclohexanone.

3. A method according to claim 1 wherein the nitric acid-treated organic phase treatment with dilute aqueous caustic solution is carried out with a 2–10% aqueous caustic solution at a temperature of about 75–100° C. in the liquid phase.

4. A method according to claim 3 wherein the water treatment of the caustic treated organic phase is carried out using an excess of water in the range of about 7–22 volumes of water per volume of organic phase at a temperature of about 75–100° C.

References Cited

UNITED STATES PATENTS

| | | | |
|---|---|---|---|
| 2,459,690 | 1/1949 | Doumani et al. | 260—533 |
| 2,410,642 | 5/1946 | Farkas et al. | 260—586B |
| 2,938,924 | 5/1960 | Simon et al. | 260—586B |
| 2,931,834 | 4/1960 | Crouch et al. | 260—586B |
| 2,452,741 | 11/1948 | Fleming | 260—531X |
| 3,316,302 | 4/1967 | Steeman et al. | 260—586B |
| 3,093,686 | 6/1963 | Simon et al. | 260—586B |
| 3,047,629 | 7/1962 | Steeman | 260—586B |
| 3,109,860 | 11/1963 | Lidov et al. | 260—586B |
| 2,703,331 | 3/1955 | Goldbeck, Jr. et al. | 260—533 |

LORRAINE A. WEINBERGER, Primary Examiner

D. E. STENZEL, Assistant Examiner

U.S. Cl. X.R.

260—531, 586, 631